United States Patent [19]
Kato

[11] 3,894,826
[45] July 15, 1975

[54] APPARATUS FOR CONTINUOUSLY PRODUCING A SHEET SHAPED PRODUCT

[75] Inventor: Tetsuji Kato, Otake, Japan

[73] Assignee: Mitsubishi Rayon Company Limited, Tokyo, Japan

[22] Filed: Jan. 17, 1974

[21] Appl. No.: 434,345

[30] Foreign Application Priority Data
Jan. 18, 1973 Japan................................ 48-8159
Jan. 18, 1973 Japan................................ 48-8165

[52] U.S. Cl. ................. 425/224; 425/329; 264/216
[51] Int. Cl.............................................. B29d 7/02
[58] Field of Search.................... 425/223, 224, 329; 264/216

[56] References Cited
UNITED STATES PATENTS
| | | | |
|---|---|---|---|
| 3,065,500 | 11/1962 | Berner............................... | 425/4 C |
| 3,371,383 | 3/1968 | Hellsund......................... | 425/404 X |
| 3,377,652 | 4/1968 | Politzer et al.................. | 425/4 C X |
| 3,462,795 | 8/1969 | Hermanns...................... | 425/4 C X |

FOREIGN PATENTS OR APPLICATIONS
6,919,602  7/1970  Netherlands........................ 264/216

Primary Examiner—Francis S. Husar
Attorney, Agent, or Firm—Kenyon & Kenyon

[57] ABSTRACT

Improvements are disclosed of an apparatus for continuously producing a sheet shaped product from polymerizable liquid raw material by using confronting upper and lower spans formed by endless running belts. In one of the improvements, a feeding means for feeding the liquid raw material into the apparatus comprises a liquid raw material feeding device detachably mounted on a movable carrier engaged with a part of the apparatus. The carrier may be moved whereby the feeding device is always prevented from coming into contact with the upper and lower endless belts. In another improvement, the apparatus is provided with means for continuously feeding flexible gaskets from a stock into the apparatus in order to seal the sides of the product forming space between the endless belts, at a speed substantially the same as the running speed of the endless belts. The gasket feeding means includes a heater through which the flexible sealing gaskets pass prior to being fed into the apparatus while undergoing heating, whereby residual stress present in the flexible sealing gaskets is removed, and undesirable deformation of the sealing gaskets is eliminated.

10 Claims, 6 Drawing Figures

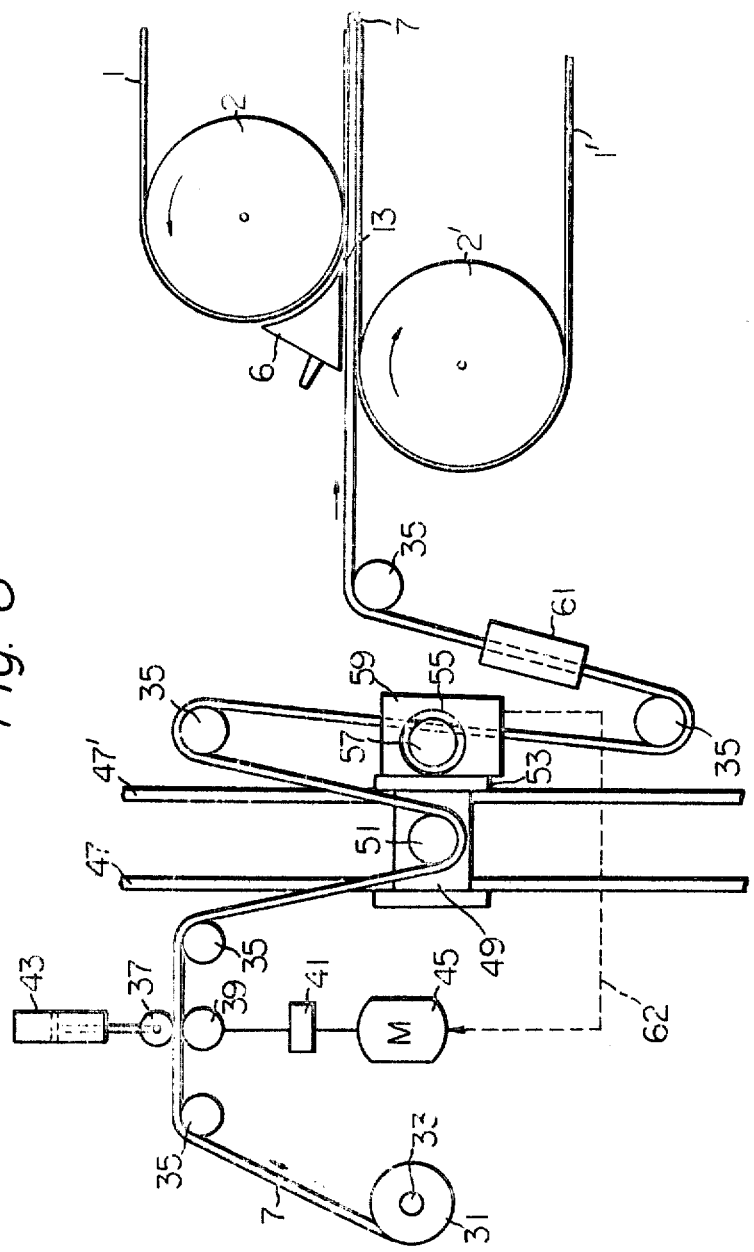

APPARATUS FOR CONTINUOUSLY PRODUCING A SHEET SHAPED PRODUCT

The present invention relates to improvements in an apparatus for continuously producing a sheet shaped product by continuously polymerizing or solidifying liquid polymerizable compounds or the like.

In a known apparatus for continuously producing such sheet shaped products by continuously polymerizing the polmerizable compounds, such as methyl methacrylate, a pair of upper and lower endless belts, mounted respectively on a pair of main pulleys are arranged so that the two endless belts form two horizontally and longitudinally extended belt working lengths or spans which are vertically spaced apart, and are running in the same direction at the same speed. The running of the endless belts is provided by driving one or more of the main pulleys. The two belt working lengths of the upper and lower endless belts define a horizontally extended long space therebetween. Also, in the known apparatus, the transversely opposite side openings of the two belt working lengths are closed in a tight seal by means of the two sealing gaskets which are respectively and continuously fed in the transversely opposite end parts of the long horizontal space so as to be sandwiched by and in close contact with the transversely opposite side edge parts of the two belt working lengths. As the continuous sealing gaskets are sandwiched by the running belt working lengths, the sealing gaskets are pulled by the two belt working lengths under a friction force and moved at the same speed as the belt working lengths. Consequently, at the longitudinally opposite extreme ends of the horizontal long space, an inlet opening into which the liquid material of polymerizable compounds is fed into the apparatus, and an outlet opening from which the polymerized or solidified sheet shaped product continuously moves out, are formed.

When the liquid material is continuously fed into the known apparatus, a material feeding device is used, which is usually located an appropriate distance apart from the inlet opening side of the endless belts so as not to damage the external or working surfaces of the endless belts. The liquid material fed into the sealed horizontal space of the apparatus is continuously polymerized in the sealed space while the material is conveyed by the endless belts from the inlet opening side to the outlet opening side. Thus, the sheet shaped polymerized product can be continuously obtained from the outlet opening of the apparatus.

The use of the above-mentioned material feeding device is principally intended for generating a hydraulic pressure by the fed liquid material within the sealed spaced whereby the upper belt working length is always horizontally supported by the material, and also for preventing leakage of the liquid material from the inlet opening of the apparatus when the liquid material is poured into the sealed space. In various kinds of known material feeding device, the most conventional one is devised so as to be directly connected with the main pulley of the upper endless belt by a suitable connecting means while being separate from the belt surface of the upper endless belt. The material feeding device is also separated from the belt surface of the lower endless belt, since the device is designed to be positioned above the belt surface of the lower endless belt. Thus, the relative separation of the material feeding device and the upper and lower endless belts can always be kept constant, even in the case where the main pulleys are moved to adjust tension present in the belts when expansion of the endless belts takes place due to a rise in the temperature of the apparatus during operation, or to adjust possible snaking movements of the upper and lower endless belts. Consequently, the material feeding device directly connected to the main pulley of the upper endless belt does not damage the surfaces of the endless belts.

Since the length of each endless belt can alter with the change of tension present in the belt or the change of temperature of the endless belt, it is quite conventional to compensate expansion of the endless belt due to the increase in the tension present in the belt or the rise in temperature of the belt during operation of the apparatus, by moving the position of the main pulleys. Also, in order to adjust the snaking movement of the endless belts which can possibly occur during the sheet shaped product producing operation of the apparatus, it is quite conventional to angularly displace the main pulleys of the endless belts with respect to the running direction of the endless belts, by means of cylinders. Thus, it must be considered that the position of each main pulley is often changed and is not kept stationary during the operation of the apparatus.

However, as was previously explained, the material feeding device of the known apparatus is directly connected to the main pulley of the upper endless belt so that constant separation of the device from the endless belts is always ensured. This fact is definitely effective in preventing direct contact of the material feeding device with the surfaces of the endless belts. However, it should be noted that direct connection between the material feeding device and the main pulley of the endless belt brings about incompleteness in attainment of easy operation of the apparatus or incompleteness in performance of the apparatus. That is, such a direct connection between the material feeding device and the main pulley of the upper endless belt results in the fact that the device must be permanently built in the known sheet shaped product producing apparatus. This permanently built-in device is inconvenient, since the device must often be replaceable with another feeding device because of the following production requirements.

That is, the liquid material of the polymerizable compounds or the like usually sticks to the interior walls of the material feeding device during feeding of the liquid material to the sheet product producing apparatus. Therefore, when the liquid material requires exchange with a different kind of liquid material during the operation of the apparatus, for example, when an initial liquid material containing a pigment requires exchange with another subsequent liquid material containing no pigment, the initial liquid material sticking to the interior walls of the feeding device will mix with the subsequent liquid material, if the same device is used for feeding the subsequent liquid material. Consequently, the subsequent liquid material can be contaminated. In order to avoid this contamination, the material feeding device used for the feeding of the initial liquid material must be exchanged with a new feeding device before beginning feeding of the subsequent liquid material during continuous operation of the sheet shaped product producing apparatus.

In the case of the known sheet shaped product producing apparatus of the type described, loss of production rate caused by interrupting operation of the apparatus due to the exchange of the material feeding device must be considered to be excessively large. Therefore, it is an emphatic requirement that the exchange of a material feeding device be effected without interruption of the operation of the apparatus.

An object of the present invention is to provide an apparatus for continuously producing a sheet shaped product, which is provided with an improved liquid material feeding means capable of eliminating the described undesirable points of the known liquid material feeding device.

Furthermore, in the known kind of apparatus, it is conventional to use sealing gaskets having a low compression strength such as 0.01 to 0.5 (kg/cm) when compressed to have a thickness which corresponds to an intended sheet thickness of a polymerized sheet shaped product, to enable the sheet shaped product to have a constantly uniform thickness. These sealing gaskets are provided with the shape of a hollow tube or of a hollow body having a square or rectangular cross section, and further, the sealing gaskets are usually made of flexible material, such as soft polyvinyl chloride. The sealing gaskets, of course, may be made of other soft material, such as polyethylene or other flexible plastics, or natural or synthetic rubber. In the case where gaskets composed of polyethylene, rubber or the like are used, the used gaskets can be reclaimed as new sealing gaskets.

When a raw liquid material for producing a sheet shaped product is a monomer having a low viscosity, it has been ascertained that employment of sealing gaskets provided with a square or rectangular cross section can be the most effective for preventing leakage of the monomer liquid material while the material is being poured into the apparatus. When a partially polymerized polymer-monomer solution is used as a raw liquid material for producing a polymerized sheet shaped product, employment of sealing gaskets having a hollow tubular shape is sufficient for preventing leakage of the liquid material from the previously mentioned horizontal space between the upper and lower endless belts of the apparatus, since the liquid material is more highly viscous. Rod members made of flexible plastics or various closed cellular plastic foams can sometimes be used as material for a sealing gasket. In the case of hollow tubular sealing gaskets, the compression strength can be lowered by appropriate selection of the outer diameter and wall thickness and by appropriate choice of material, for example, by selection of a polyvinyl chloride resin incorporated with a large amount of plasticizer. Also, when a plastic foam is chosen as material for sealing gaskets, the compression strength of the sealing gasket can be lowered by increasing the expansion ratio.

In the process for producing a sheet shaped product of polymerizable compounds, the vertical distance between the two belt working lengths of the upper and lower endless belts of the apparatus must be changed with changes of the desired thickness of the sheet shaped product and therefore, the thickness of the sealing gasket should be correspondingly changed. As a result, it is necessary to keep in stock several kinds of sealing gaskets having different outer diameters and wall thickness in the case of hollow tubular gaskets, or different thicknesses in the case of rod-type or solid sealing gaskets and to employ an appropriate kind depending on the intended sheet thickness of the produced sheet shaped product.

If a sealing gasket producing machine is directly connected to the sheet product producing apparatus and if the produced sealing gaskets are immediately fed to the sheet product producing apparatus, unfavorable deformation of the sealing gaskets can be avoided and the sealing gaskets can be used while retaining the originally designed form. As a result, the sealing gaskets exert their sealing functions sufficiently when fed into the sheet shaped product producing apparatus. However, an arrangement such as a direct connection of the sealing gasket producing machine and the sheet shaped product producing apparatus is not advantageous from the point of view of economical arrangement of the entire sheet shaped product producing plant, since the rate of producing sealing gaskets cannot be fitted to the speed of the continuous production of the sheet shaped product. That is, the former rate is much higher than the latter speed. Furthermore, as the hollow tubular sealing gaskets and rod-shaped gaskets made of soft polyvinyl chloride are produced by an extruding machine, when the outer diameter and wall thickness of the hollow tubular gasket or the thickness of the solid rod is changed, the operation of the extruding machine should be interrupted for replacement of dies.

Thus, it is absolutely necessary to maintain a stock of several kinds of sealing gaskets to enable the continuous production of sheet shaped polymerized products having diverse thicknesses. Therefore, in general, large stocks of various sealing gaskets are preliminarily prepared and an adequate kind is chosen from the stock depending on the sheet thickness of the sheet shaped product to be produced by the sheet product producing apparatus. In this connection, it is quite conventional for sealing gaskets to be stocked in the form of bundles of a unit length of 500 to 1,500 meters, or wound on rollers or bobbins, in order to save storage space. Accordingly, the stocked sealing gaskets are easily crushed, flattened and deformed during storage. When such deformed sealing gaskets are used as they are, they fail to completely seal both transversely opposite side openings of the confronting belt working lengths spaced a certain distance apart. Consequently, the raw liquid material fed into the apparatus leaks out over the deformed sealing gaskets and adheres to the rear surfaces of the upper and lower endless belts so as to contaminate them. Also, failure of complete sealing causes formation of bubbles in the raw liquid material. Further, the leakage of the raw liquid material makes it difficult to obtain a sheet shaped product of uniform thickness and is also economically disadvantageous. Thus, it should be understood that use of such deformed sealing gaskets results in great losses.

Furthermore, it should be understood that in order to prevent leakage of the raw liquid material from a sheet product producing apparatus in the material feeding zone prior to the polymerizing or solidifying zone, the sealing gaskets must be recovered from deformation prior to feeding into the apparatus.

The present inventor has now found that when sealing gaskets deformed by external forces are processes so as to restore the initial shape prior to their usage by removing the residual stress present in the gaskets and are then fed into a sheet shaped product producing apparatus in a continuous manner at the same speed as the upper and lower endless belts, the transversely opposite side openings between the running horizontal belt face parts of the endless belts can be completely sealed by the gaskets and therefore, the sealing gaskets can sufficiently exhibit their sealing function.

Another object of the present invention is to provide an improved apparatus for continuously producing a sheet shaped product, which is provided with a novel gasket feeding means capable of feeding sealing gaskets between the belts working surfaces, which are recovered from the previously described deformation into their original correct shape they had prior to their storage or other handling causing their deformation.

The present invention will be readily understood from the ensuing description of the embodiments of the present invention with reference to the accompanying drawings wherein.

Figure 4:
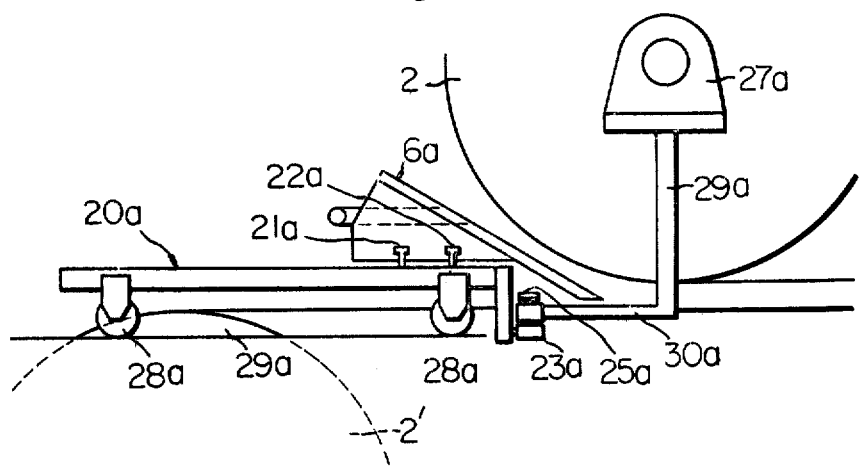
Figure 5:
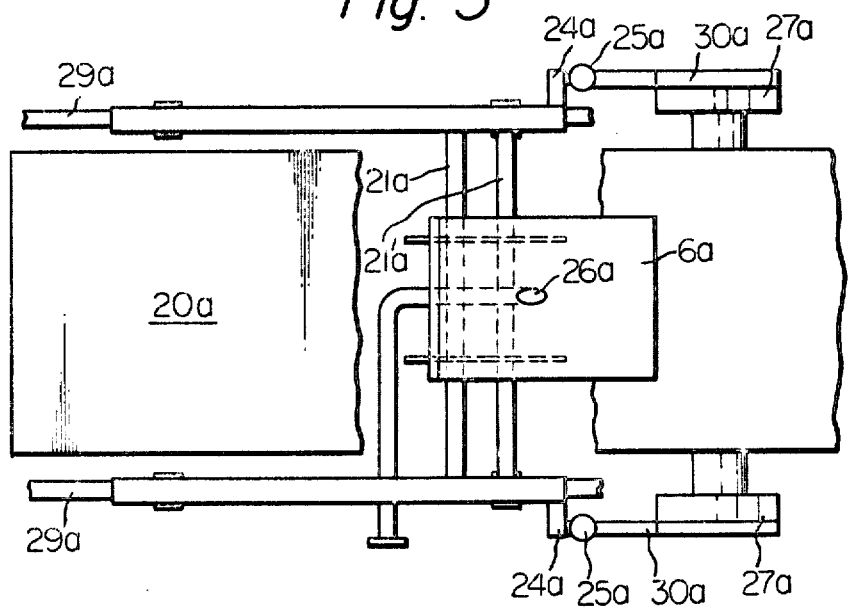

FIGS. 4 and 5 are enlarged partial side and plan views, respectively, of another embodiment of a material feeding means connected to the endless belt part of a sheet shaped product producing apparatus according to the present invention; and FIG. 6 is a schematic view of a sealing gasket feeding means located in the front stage of the endless belt part of a sheet shaped product producing apparatus according to the present invention.

Figure 1:
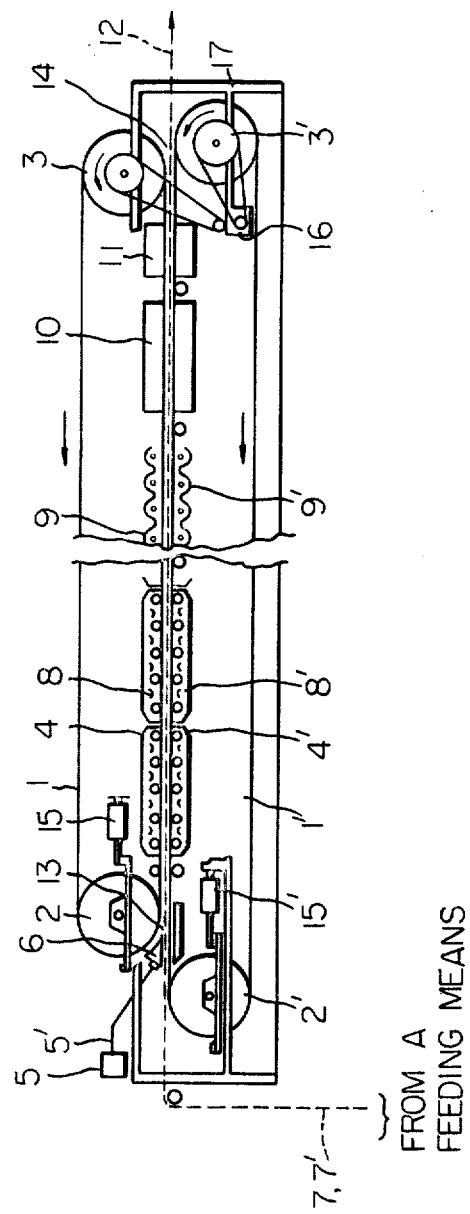
FIG. 1 is a side elevational view of an apparatus for continuously producing a sheet shaped product according to the present invention, illustrating schematically the horizontal arrangment of the upper and lower endless belts.

Referring to FIG. 1, 1 and 1' are upper and lower endless belts each of which is generally a metal belt made of steel or stainless steel. The external surface of the belt 1 or 1' is carefully polished and in some particular cases, plated so that when the belt is actually used in an apparatus for producing a sheet shape product, the sheet product can be produced with excellent surface appearance. The endless belt 1 or 1' is usually 0.1 to 3 millimeters thick and preferably 0.5 to 2 millimeters thick. The two endless belts are stretched by a pair of main pulleys 2 and 3, and 2' and 3', respectively, and thus given a necessary tension for preventing relaxation of the endless belts. In the apparatus of FIG. 1, each main pulley 2 or 2' is provided with hydraulic thrust or having a cylinder 15 or 15' to control the tension present in the belt 1 or 1' by changing its hydraulic pressure. It is also broadly known to adjust the tension of the endless belt by using a spring or other mechanical elements. Although it is desirable that the tension of each endless belt 1 or 1' be increased as much as possible to improve the operating condition of the endless belt, and thereby improve the accuracy of the thickness of the sheet product produced by the apparatus, the operating tension is generally maintained at 3 to 15 kg/square millimeter of belt thickness.

In the apparatus of FIG. 1, the endless belts 1 and 1' are driven so as to run about main pulleys 2 and 3, and 2' and 3', by the main pulleys 3 and 3' in a manner described in detail in Japanese Patent Publication No. 33494/1972. The main pulleys 3 and 3' are associated with a drive source 16, such as an electric motor, so as to derive drive forces via belt and pulley mechanism. However, the endless belt drive mechanism described in Japanese Patent Publication No. 33496/72 can be utilized in this invention. The running direction and the running speed of both upper and lower endless belts 1 and 1' are always kept equal. The possible snaking movement of the upper and lower endless belt can be adjusted by changing the angularity between the rotating axes of the main pulleys 2 and 3, or 2' and 3'. The change of the above-mentioned angularity can be attained by means of a hydraulic cylinder or other appropriately designed mechanical devices (not shown). The snaking movement of the endless belt 1 or 1' may also be adjusted by changing the angles of the groups of rollers 4 or 4' which contact and support the rear surface of the endless belt 1 or 1', with respect to the running direction of the endless belt.

The reference numeral 5 designates a device for supplying a liquid raw material, such as monomer or syrup mixed with catalyst or other additive, by way of conduit 5' into a liquid raw material feeding device 6 mounted on a feeding device carrier (not shown in FIG. 1). The supplying of the raw material is usually effected by a quantitative pump (not shown) at a constant rate. The liquid raw material feeding device 6 feeds the liquid material supplied from the device 5 into a horizontal space defined between two horizontally extending working lengths of the upper and lower endless belts. That is, the working lengths of both endless belts 1 and 1' mutually confront, and are vertically spaced apart. At the longitudinally opposite extreme ends of the space formed between the working lengths, an inlet opening 13 and an outlet opening 14 of the apparatus are formed. The performance of the material feeding device 6 may be the same as a known device described in Japanese Patent Publications No. 41602/1971 and No. 34815/1972 and French Pat. No. 2,027,385, although small mechanical modification may be made so as to fit it for use in the apparatus according to the present invention.

Numerals 7 and 7' are sealing gaskets which are continuously fed from the stock as previously described into the transversely opposite sides of the confronting belt working lengths of the two endless belts 1 and 1', and run under pulling action by the running endless belts while preventing leakage of the liquid raw material from the space defined between the belt working lengths. In other words, the sealing gaskets 7 and 7' close and tightly seal the transversely opposite side openings formed between the belt working lengths. In accordance with the present invention, these sealing gaskets 7 and 7' are provided with an initially designed normal shape without deformation, such as being bent or crushed, and fed continuously from the stock by means of a gasket feeding means which is located at a front stage close to the inlet opening 13 of the apparatus for producing a sheet shaped product according to the present invention.

The groups of rollers 4 and 4' supporting the endless belts 1 and 1' should be arranged at intervals so that the liquid material being continuously conveyed does not leak out of the space at or before the polymerization zone. The endless belt 1 or 1' undergoes bending due to the hydraulic pressure of the liquid material and the repellent force of the running sealing gaskets 7 and 7', at each part of the endless belt between adjacent rollers 4 or 4'. However, if this bending exceeds a certain limit, the thickness of the sheet shaped product becomes unacceptable. Also, if any gap develops between the endless belt and the sealing gaskets due to the bending of the endless belt, the liquid material may leak out, or exterior air may intrude through the gap whereby bubbles or foams are formed in the sheet shaped product being polymerized.

It can, therefore, be understood that any means which can minimize the bending of the endless belt can also result in remedying of the foregoing troubles. One remedy is to shorten the spacing between adjacent rollers 4 and 4' as well as to increase the belt tension. In this case, the spacing between respective adjacent rollers (the distance between the centers of the two immediately neighboring rollers) should be 20 to 100 centimeters. The rollers 4 and 4' are also disposed so that they can automatically follow the reduction in the thickness of the material for the sheet product which reduction takes place because of contraction of the material while being polymerized or solidified between the endless belts, and also so that they can always keep contact with the rear surfaces of the endless belt. Rather than using rollers 4 and 4', a mechanism described in Japanese Patent Publication No. 33498/1972 may be utilized in the apparatus according to the present invention for supporting the endless belts.

Numerals 8 and 8' designate hot water spray systems arranged in the polymerizing zone and used for heating the endless belts passing through the polymerizing zone during polymerizing operation in order to raise the temperature of the endless belts to a required level for polymerization of the material, by spraying hot water on the rear surfaces of the belts. The temperature of the hot water may be 100° centigrade or less, but usually temperatures of 70° to 95° centigrade are preferred in order to obtain rapid polymerization. The rapid polymerization serves to avoid use of larger continuous polymerization equipment and helps increase the productivity of the sheet product producing apparatus according to the present invention.

Numerals 9 and 9' designate far-infrared heaters which are provided at the second polymerizing zone of the apparatus and are used for heating the sheet product between the endless belts to above 100° centigrade to remove the remaining monomer from the polymerized sheet product. A blast hot-air type heater may be substituted for the radiant heaters 9 and 9'.

Numerals 10 and 11 designate temperature controlling zones which serve for appropriately cooling the sheet product at a controlled cooling rate to a required temperature after the sheet product has passed through the second polymerizing zone.

Numeral 12 indicates a finished sheet product obtained from outlet opening 14 of the apparatus after the liquid raw material has passed all the zones described.

Numeral 17 indicates a framework of the apparatus of FIG. 1.

An embodiment of a material feeding means according to the present invention will now be described in more detail with reference to FIGS. 2 and 3.

Figure 2:
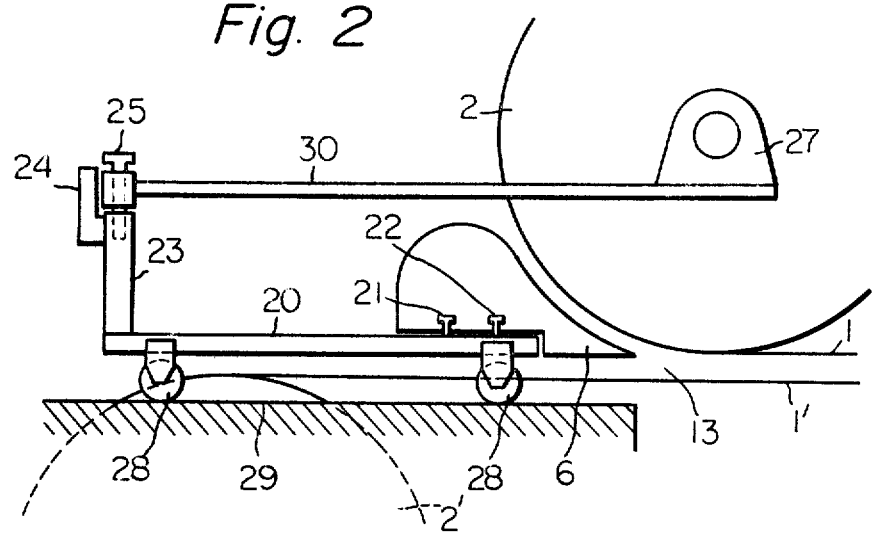
FIGS. 2 and 3 are enlarged partial side and plan views of an embodiment of a material feeding means connected to the endless belt part of a sheet shaped product producing apparatus according to the present invention.
Figure 3:
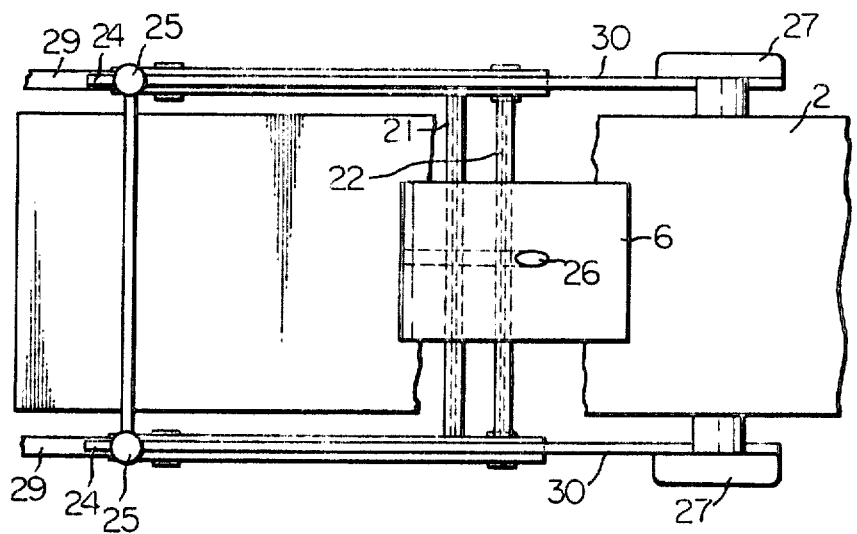

At the liquid raw material feeding end having the inlet opening 13 of the apparatus of FIG. 1, the upper and lower main pulleys 2 and 2' are positioned so that the lower one is situated so as to be displaced or offset in the longitudinally front direction of the apparatus, that is in the leftward direction in FIG. 2. Located at this liquid raw material feeding end of the apparatus is the material feeding device 6 having a wedge shape outline as in seen from FIG. 2. This material feeding device 6 is mounted on a carrier 20 in a detachable manner as described hereinafter. This is, the bottom of the material feeding device 6 is provided with two T letter-shape grooves extending transversely as shown in FIG. 2, and transverse rails 21 and 22 rigidly secured to the carrier 20 have the same cross-sectional T letter-shape as the grooves of the device 6. Therefore, insertion of transverse rails 21 and 22 into the grooves of the device 6 and withdrawal of the device 6 from rails 21 and 22, respectively attain mounting and dismounting of the device 6 on carrier 20.

Carrier 20 is provided with wheels 28 for permitting the device 6 to move on the two rails 29 in the longitudinal direction of the apparatus. A pair of bearings 27 is mounted on the shaft 2a of the main pulley 2 of the endless belt 1 so as to perform the same horizontal movement as the pulley 2 when, for example, the pulley 2 is horizontally moved in order to adjust the tension of the endless belt. Each bearing 27 is provided with an arm 30 secured thereto. Therefore arms 30 are permitted to carry out the same horizontal movement as the pulley 2 when the pulley moves. These arms 30 are provided for connecting carrier 20 to the main pulley 2. These arms or bars 30 may be replaceable by others of different length, so that bars of preselected length may be used to provide a spacing between the feeding device 6 and the pulley 2 suitable for the material fed and the operating conditions of the apparatus.

Before the apparatus is started, carrier 20 mounting the material feeding device 6 thereon is moved toward the main pulley 2 on the rails 29, and is stopped at a required position when stops 24 provided at the end of the carrier contact with the ends of the arms 30 as shown in FIG. 2. Then, the carrier 20 is locked in place by connecting and locking a pipe member secured to the end of each arm 30 to each connecting pipe 23 provided on the end of the carrier 20 by means of each stop pin 25. Of course, this locking position of carrier 20 is determined so as to allow the liquid raw material fed from the device 6 to be supplied in the appropriate stabilized flow condition necessary for obtaining a defectless sheet product. Thus the relative longitudinal position of carrier 20 with respect to the position of the main pulley 2 is kept constant. The device 6 is mounted on and located in place on carrier 20 by means of transverse rails 21 and 22 described before, and is separated or spaced from the pulley 2 so as not to contact the external surface of the endless belt 1. It should be noted that on these rails 21 and 22, the device 6 can move only transversely and substantially horizontally.

Replacement of the used feeding device 6 with a new feeding device 6 is very easily accomplished in the manner below.

First, the used feeding device 6 to be replaced is moved transversely on rails 21 and 22 by a small amount to one side of carrier 20, and a new feeding device 6 is mounted on carrier 20 by engaging rails 21 and 22 of carrier 20 with the grooves 21 and 22 of the new device 6 from the opposite side until the used and new feeding devices 6 are arranged side by side. Then, the feeding operation of the used feeding device is switched to the new feeding device. In accordance with this carrier 20, the installing position of the feeding device 6 can be freely changed without danger of the contact between the feeding device 6 and the endless belt 1. Because the feeding device 6 can move transversely on rails 21 and 22, it can feed the liquid raw material at any desired transverse position along rails 21 and 22 of carrier 20. For example, if the belt dimension of each endless belt 1 or 1' is not equivalent in the direction of the width of the endless belt, or if the tension present in the endless belt is altered in order to adjust the snaking movement of the endless belt, it often results in that a varied thickness distribution is generated in the finished sheet shaped product in the widthwise direction of the sheet shaped product. In such cases a uniform thickness distribution in the widthwise direction can advantageously be obtained by adjusting the location of the feeding device 6 along transverse rails 21 and 22 from the normal position where a pouring opening 26 of the device out from which opening the liquid raw material is poured into the apparatus, is situated at the center of the carrier 20.

Further, by removing pins 25 and disconnecting arms 30 from pipes 23 of carrier 20, the carrier 20 together with feeding device 6 can be moved away from the main pulley 2 to any longitudinal position along rails 29. This fact enables the raw material to spread on the external surface of the lower endless belt 1' and in the transverse direction quickly, when such quick spreading of the raw material is necessitated. Also, the above-mentioned fact helps minimizing accidental damaging of the endless belt caused by unfavorable accidental contact of the feeding device 6 to the external surface of the upper endless belt 1 and further serves to accelerate the checking or cleaning operation of the device 6 by an operator.

In accordance with the raw material feeding means of the present invention, plural numbers, at least two, of the feeding device 6 can be used simultaneously because each has a width transversely less than the extent of the rails 21 and 22, and they can be used for simultaneously feeding the raw material in the apparatus.

Another embodiment of the feeding means of the present invention is shown in FIGS. 4 and 5. However, this embodiment can operate in the same principle as the embodiment of FIGS. 2 and 3, and is constructed by like elements although they differ in shape. Note that the feeding device 6a is only a flat decline. Therefore, the like elements are designated by using the same reference numerals while attaching a suffix "a" to the numerals.

The reason the fed liquid material does not run backwards from the inlet to the space between the belts, is that the belts are driven forwardly at speeds which force the material forwardly into the space while developing the hydraulic pressure on the material which holds the belts apart. Transverse spreading of the material does not occur for the same reason, until the material is safely within the space between the belts and is approaching the polymerizing or hardening zone. After spreading, to completely fill the space between the belts, the side sealing gaskets are required to confine the material and prevent its transverse leakage.

An embodiment of a gasket feeding means of the present invention will be described hereinafter with reference to FIG. 6 which schematically illustrates the feeding of a sealing gasket into only one side of the endless belts. The feeding of a sealing gasket into the other side of the endless belts can be and is effected by arranging another corresponding gasket feeding means. However, the feeding of sealing gaskets 7 and 7' into both sides of the endless belts by a single gasket feeding means will be easily attained by persons skilled in the art of this field by slightly modifying the arrangement of guide rolls of the means of FIG. 6.

Referring to FIG. 6, the sealing gasket 7 is stocked by being wound on a bobbin 31. When the feeding of gasket is to be started, the bobbin 31 is mounted on a stationary rotating shaft 33. The sealing gasket 7 to be drawn out from bobbin 31, is firstly pinched between a pinch roll 37 and a drive roll 39. The pinch roll 37 is associated with a cylinder 43, such as a hydraulic or pneumatic cylinder, which controls the pinching force of the roll 37. The drive roll 39 is connected to drive motor 45, such as an electric servo motor, via a reduction gearing 41. The drive motor 45, therefore, drives the drive roll 39 which in turn effects drawing out of the sealing gasket 7. Subsequently, sealing gasket 7 is led so as to pass around a running roll 51 carried by a roll carrier 49, via one of stationary guide rolls 35. The roll carrier 49 carrying roll 51 is able to run along a pair of straight vertical guide rails 47 and 47', and is also provided with a toothed rack 53 at one side thereof. The toothed rack 53 of roll carrier 49 is engaged with a pinion 55 which is arranged to be coaxial with a rotor 57 of a rotation detector 59. As a result, the movement of carrier 49 causes rotation of pinion 55 together with rotor 57. The rotation of the rotor 57 depending on the movement of carrier 49, is then detected by detector 59 which is capable of producing a signal indicative of the direction and the magnitude of the rotation of the rotor 57. A commercially available rotary potentiometer may be advantageously used as the detector 59.

Sealing gasket 7 passing around running roller 51 is then led through several guide rolls 35 and a heater 61, as described later, to the space between the upper and lower endless belts 1 and 1', and is gripped by both endless belts. As the endless belts are always running at a constant speed, the sealing gasket 7 gripped by the endless belts 1 and 1' is pulled by the endless belts at the same speed. Therefore, the drawing out of the sealing gasket 7 from the stock wound on bobbin 31 must be carried out at the same speed as the running speed of the endless belts. If the speed of the drawing out of the sealing gasket 7 driven by drive roll 39 is slower than the running speed of the endless belts 1 and 1', running roll 51 together with roll carrier 49 are moved in the upward direction of FIG. 6, because the sealing gasket 7 is subjected to pulling action by the endless belts 1 and 1'. This movement of running roll 51 is detected by detector 59, and the signal indicative of the direction and the magnitude of the movement of running roll 51 is generated by detector 59. The signal is then fed back to the servo motor 45 through a feedback line 62 shown by a dotted line in FIG. 2, so that the motor 45 speeds up the rotation of drive roll 39 in response to the signal. To the contrary, if the speed of the drawing out of sealing gasket 7 driven by drive roll 39 is faster than the running speed of the endless belts 1 and 1', running roll 51 is moved in the downward direction of FIG. 6, along rails 47 and 47'. As a result, the signal in response to which the motor 45 slows down the rotation of drive roll 39, is generated by the detector 59. Thus, during the operation of the apparatus according to the present invention, control is carried out so that the feeding speed of sealing gasket 7 is equivalent to the running speed of the endless belt 1 and as a result, the tension present in sealing gasket 7, which is running between running roll 51 and the inlet opening 13 of the apparatus, is kept constant. Further, it should be noted that according to the gasket feeding means of FIG. 6, mechanical resistance of bobbin 31, such as a frictional torque acting on bobbin 31, does not exert harmful influence on sealing gasket 7 running after pinch roll 37 and drive roll 39, since drawing out of sealing gasket 7 is effected by drive roll 39 located adjacent to the bobbin 31.

The heater 61 heats up sealing gasket 7 while the gasket runs through the heater 61 prior to being fed into the space between both endless belts 1 and 1'. As the tension present in the gasket 7 running through the heater 61 is kept constant, the residual stress in the gasket 7 is removed uniformly by being heated by the heater 61. As a result, any deformation of sealing gasket 7 is eliminated, and the shape of sealing gasket 7 can be restored to its initially designed shape. The heater 61 may be a heater which employs steam as heating medium or an electric heater. In the case where sealing gasket is made of a thermally plastic material, the heating temperature of the heater 61 is selected to be within the range of 50° to a 100° centigrade, for example.

EXAMPLE

A methyl methacrylate polymer having a degree of polymerization of about 900 was dissolved in monomeric methyl methacrylate to form a solution having a viscosity of 1 poise as measured at 25°C and a polymer concentration of about 20 percent by weight. The solution was incorporated with 0.05 percent by weight of azobisisobutyronitrile as a polymerization catalyst. The resulting liquid material was fed by means of a metering pump and introduced under pressure between the confronting belt working lengths of upper and lower endless belts by means of a material feeding device 6. Each of the belts 1 and 1' was a smooth stainless steel belt having a thickness of 1 mm and a width of 1,200 mm. The belts 1 and 1' were supported by groups of rollers 4 and 4' and the distance between the confronting working lengths of the belts 1 and 1' was so adjusted that the resulting sheet shaped polymer product would have a uniform thickness of 3mm.

The whole length of the polymerization zone was 60 m, and in the front portion of 40m, warm water maintained at 80°C was showered and scattered on the rear surface of the belts to heat them, while in the remaining portion of 20 meters the heating was effected in an air furnace maintained at 120°C.

Hollow tubular gaskets having a thickness of 0.6 mm and an outer diameter of 6 mm and composed of polyvinyl chloride incorporated with dibutyl phthalate as a plasticizer in an amount of 60 parts by weight per 100 parts by weight of the polymer were used as gaskets 7 and 7'. The gaskets exhibited a compression strength of 0.07 kg/cm when compressed to 3 mm at 80°C. Since the gaskets had been stored in the wound state after production they were crushed and deformed flatly. Prior to feeding of these gaskets to the space between the confronting working lengths of the belts, steam was directly applied to the gaskets to heat them for 30 seconds while adjusting the amount of stream so that the temperature was 90°C in the vicinity of the gasket surface. Then, the gaskets were fed to the sheet product producing apparatus at a rate of 1 m/min. The original form was restored in the gaskets before they reached the side portion of the starting material feeding device 6. Thus, a smooth transparent sheet product having an average degree of polymerization of about 5,000 and a thickness accuracy of 3 ± 0.3mm was continuously obtained without leakage of the liquid raw material.

When deformed gaskets were directly fed to the apparatus at the same speed as the belt running speed, i.e., 1 m/min, without the steam treatment for restoration of the original form, the liquid material leaked over the gaskets from the side portions of the space between the confronting working lengths of the belts, and the liquid adhered on the rear surface of the lower belt and contaminated it. Further, the thickness accuracy of the resulting sheet shaped product was outside the range of 3 ± 0.3 mm.

The above shows that by proper design of the heater 61 shown by FIG. 6, to reproduce the heating effected by the steam heating described above, that the gasket when deformed, can be returned to its original contour and dimensions.

What is claimed is:

1. An apparatus for continuously producing a sheet-shaped product from polymerizable liquid raw material, said apparatus comprising endless belts each running about pulleys spaced from each other, said belts mutually forming spaced-apart belt working lengths running in the same direction, said lengths defining an extended space therebetween, means running with said lengths for sealing the opposite sides of said space, said pulleys at one end of said space being inlet pulleys which with said belts running thereabout form an inlet for said space, feeding means for feeding said material directly into said inlet, a carrier for said feeding means and which is positioned adjacent to said inlet, and mounting means for mounting said feeding means on said carrier to feed into said inlet said mounting means including a means for holding said feeding means against displacement relative to said carrier in the longitudinal direction of said working lengths while permitting displacement of said feeding means relative to said carrier transversely with respect to said longitudinal direction so that the feeding means may be changed without stopping the apparatus.

2. The apparatus of claim 1 in which at least one of said inlet pulleys is a belt-tensioning pulley movable in said longitudinal direction, and said carrier is movable in said longitudinal direction and has means for connecting it with said belt-tensioning pulley for movement therewith in said longitudinal direction.

3. The apparatus of claim 1 in which said mounting means is formed by at least one guide and one guideway which both extend transversely with respect to said longitudinal direction and which are respectively fixed to said carrier and to said feeding means, said guide and guideway being separable relative to each other by relative displacement therebetween transversely with respect to said longitudinal direction and permitting removal of said feeding means from said carrier while being replaced by another corresponding feeding means, said guide and guideway interengaging laterally with respect to each other.

4. The apparatus of claim 3 in which said belt working lengths are horizontal and said inlet pulleys are positioned as upper and lower pulleys of which the lower pulley is offset backwardly from the upper pulley so that the one of said belts running around the lower pulley has a horizontal portion extending therefrom into said working space, said carrier being horizontally movable in said longitudinal direction and being positioned above and spaced from said portion and said upper pulley being a belt-tensioning pulley which is horizontally movable in said longitudinal direction, at least one bar interconnecting said carrier and said belt-tensioning pulley and by its length controlling the horizontal position of said carrier relative to said belt-tensioning pulley in said longitudinal direction.

5. The apparatus of claim 4 in which said feeding means is positioned by said mounting means on the top of said carrier and the feeding means provides a surface declining towards said inlet for said space between the belts' said working lengths, said surface having means for feeding said liquid raw material thereto, said connecting bar having a length controlling the horizontal position of said carrier with respect to said longitudinal direction so as to thereby position said surface adjacent to but spaced from the one of said belts running around said upper one of said inlet pulleys.

6. The apparatus of claim 5 in which said connecting bar is removable to permit its replacement by a corresponding bar but having a different length.

7. The apparatus of claim 1 in which said a sealing means includes a gasket feeding means having a heater through which said sealing gaskets pass for heating prior to being fed into said apparatus, to remove residual stress therefrom produced by application of external force during stocking.

8. An apparatus as set forth in claim 7, wherein said heater of the feeding means employs steam as a heating medium.

9. An apparatus as set forth in claim 7, wherein said heater of the feeding means is an electric heater.

10. An apparatus as set forth in claim 7, wherein said feeding means is further provided with means for drawing out said sealing gaskets from said stock at said feeding speed thereof, a plurality of stationary rolls for guiding the sealing gaskets and arranged so as to lead said sealing gaskets drawn out from the stock to said apparatus via said heater, another roll for guiding the sealing gaskets which is carried by a roll carrier movable along straight guide ways depending on changes in the speed of the drawing out of said sealing gaskets, and a detecting means for detecting the movement of the carrier and for generating a signal indicative of magnitude and direction of said movement of the carrier, whereby said drawing out means controls the amount of drawing out of said sealing gaskets from the stock in response to said signal from the detecting means.

* * * * *